United States Patent [19]
Haus et al.

[11] Patent Number: 5,213,411
[45] Date of Patent: May 25, 1993

[54] STROBE LIGHT

[75] Inventors: Rein Haus, Manasquan; Inhong Hur, Oakhurst; Kenneth J. Bocan, Ocean, all of N.J.

[73] Assignee: Wheelock Inc., Long Branch, N.J.

[21] Appl. No.: 798,008

[22] Filed: Nov. 26, 1991

[51] Int. Cl.$^5$ ............................................ B60Q 1/00
[52] U.S. Cl. .................................. 362/368; 362/362; 362/363; 362/457; 362/62
[58] Field of Search ............... 362/368, 362, 363, 457, 362/812, 35, 62, 74, 147, 404, 95, 403

[56] References Cited

U.S. PATENT DOCUMENTS 1,507,758  9/1924  Scott ............................... 362/404 X

OTHER PUBLICATIONS

Specification (4 Sheets) of Edwards (1985).
Specification Sheet of Edwards (1988).
Specification (2 Sheets) of Edwards (undated).
Specification (3 Sheets) of Whelen (undated).
Specification (8 Sheets) of Whelen (1989).
Specification (2 Sheets) of Austin (Oct., 1988)).
Specification (2 Sheets) of Austin (Apr., 1988).
Specification Sheet of Whelen (1989).

*Primary Examiner*—Larry Jones
*Attorney, Agent, or Firm*—Brumbaugh, Graves, Donohue & Raymond

[57] ABSTRACT

A strobe light of a type suitable for safety, notification, and intrusion systems and the like includes a base, a lens having a generally cylindrical side wall defining an opening at one end, having an end wall at the other end and being attached at its open end to the base, and a lamp/electronics assembly mounted on the base and received within the side wall of the lens. The base has a generally planar main wall that is shaped and dimensioned such as to form closure for the opening of the lens side wall and having a front surface facing the end wall of the lens and a rear surface facing away from the end wall of the lens. A generally centrally located mounting boss having a threaded socket is adapted to receive a threaded mounting member. A box-mounting flange projects from the rear surface of the main wall portion, the box-mounting flange being substantially square in plan and being shaped and dimensioned to present a substantially planar rearwardly-facing edge that is wide enough to engage the edges of the side walls of either standard four-inch or standard 100-millimeter electrical boxes. Knockout holes in the main wall adjacent each corner of the box-mounting flange receive screws for attaching the base to electrical boxes.

8 Claims, 2 Drawing Sheets

STROBE LIGHT

BACKGROUND OF THE INVENTION

Strobe lights are widely used in industrial and commercial setting in safety, notification, and intrusion systems and the like. In these settings, they may be mounted on walls and other surfaces, on vehicles and on moving equipment, and they may be located indoors or outdoors. In order to meet the requirements for a wide variety of applications, it is desirable to provide a highly versatile mounting system. It is common, for example, to have a mounting base that can be either surface-mounted by means of screws installed through holes in the base or mounted on a post by means of a boss on the base having a socket.

SUMMARY OF THE INVENTION

An object of the present invention is to provide a strobe light having increased versatility in the modes of mounting it. A further object is to provide that greater versatility without significantly increasing the cost or complexity of the strobe. Yet another object is to provide a strobe that can be installed easily and quickly in a wide variety of settings and is durable, compact in size and attractive in appearance.

The foregoing objects are attained, according to the present invention, by a strobe light that includes a base, a lens having a generally cylindrical side wall defining an opening at one end, having an end wall at the other end and being attached at its open end to the base, and a lamp/electronics assembly mounted on the base and received within the side wall of the lens. The base has a generally planar main wall that is shaped and dimensioned such as to form a closure for the opening of the lens side wall and having a front surface facing the end wall of the lens and a rear surface facing away from the end wall of the lens. A generally centrally located mounting boss having a threaded socket is adapted to receive a threaded mounting member. A box-mounting flange projects from the rear surface of the main wall portion, the box-mounting flange being substantially square in plan and being shaped and dimensioned to present a substantially planar edge that is adapted to engage the edges of the side walls of either standard four-inch or standard 100-millimeter electrical boxes. Knockout holes in the main wall adjacent each corner of the box-mounting flange receive screws for attaching the base to the standard electrical boxes. The knock-out holes are, in a preferred embodiment, elongated and are oriented with their longer dimensions extending diagonally of the box-mounting flange so that they can accept screws for either standard four-inch or standard 100-millimeter electrical boxes In a preferred embodiment, the base further includes an edge flange projecting from the perimeter of the rear surface of the main wall and having a substantially planar rear edge located substantially in the plane of the box-mounting flange. The rear edge of the edge flange is adapted to engage a planar surface on which the base is mounted in a surface-mounted mode.

The base, preferably, has a plurality of circumferentially spaced-apart screw-receiving bosses in the edge flange adapted to receive screws by which the lens is attached to the base.

The base may have a peripherally extending rib that projects outwardly from the edge flange and has a front-facing shoulder. An annular mounting ring is provided, the mounting ring being shaped and dimensioned to engage the edge flange and the rib of the base and having circumferentially spaced-apart holes adapted to receive screws by which the mounting ring may be fastened to a planar surface and thereby fasten the base to such surface.

Advantageously, the base further includes a plurality of angularly spaced-apart, generally radially extending stiffener ribs joined to and projecting from the back surface of the main wall and joining the edge flange, the box-mounting flange, and the mounting boss. The ribs strengthen and stiffen the base, thus enhancing its durability.

A base gasket shaped and dimensioned to be coextensive with the base is provided for optional use. The gasket is engaged adjacent its perimeter between the edge flange of the base and a planar surface on which the strobe is mounted in either surface-mounted or recessed box-mounted installations and blocks the passage of water between the mounting surface and the strobe base. The gasket is also engaged between the edge of the box-mounting flange and an electrical box. The gasket can, of course, also be used advantageously in indoor surface-mounted applications, in which it provides a cushioning and buffering effect.

An important advantage of a strobe light embodying the present invention is that it can be used in all popular and common mounting methods, to wit: at the end of a rod, which commonly is a length of ½ inch cast iron plumbing pipe; surface-mounted by means of fasteners inserted through the knock-out holes in the base, with or without the base gasket; surface mounted by means of the mounting ring, also with or without the base gasket; and on a recessed or surface mounted standard electrical box, which may be either a four-inch box or a 100-millimeter box.

For a better understanding of the invention, reference may be made to the following description of an exemplary embodiment, taken in conjunction with the accompanying drawings.

DESCRIPTION OF THE EMBODIMENT

Figure 1:
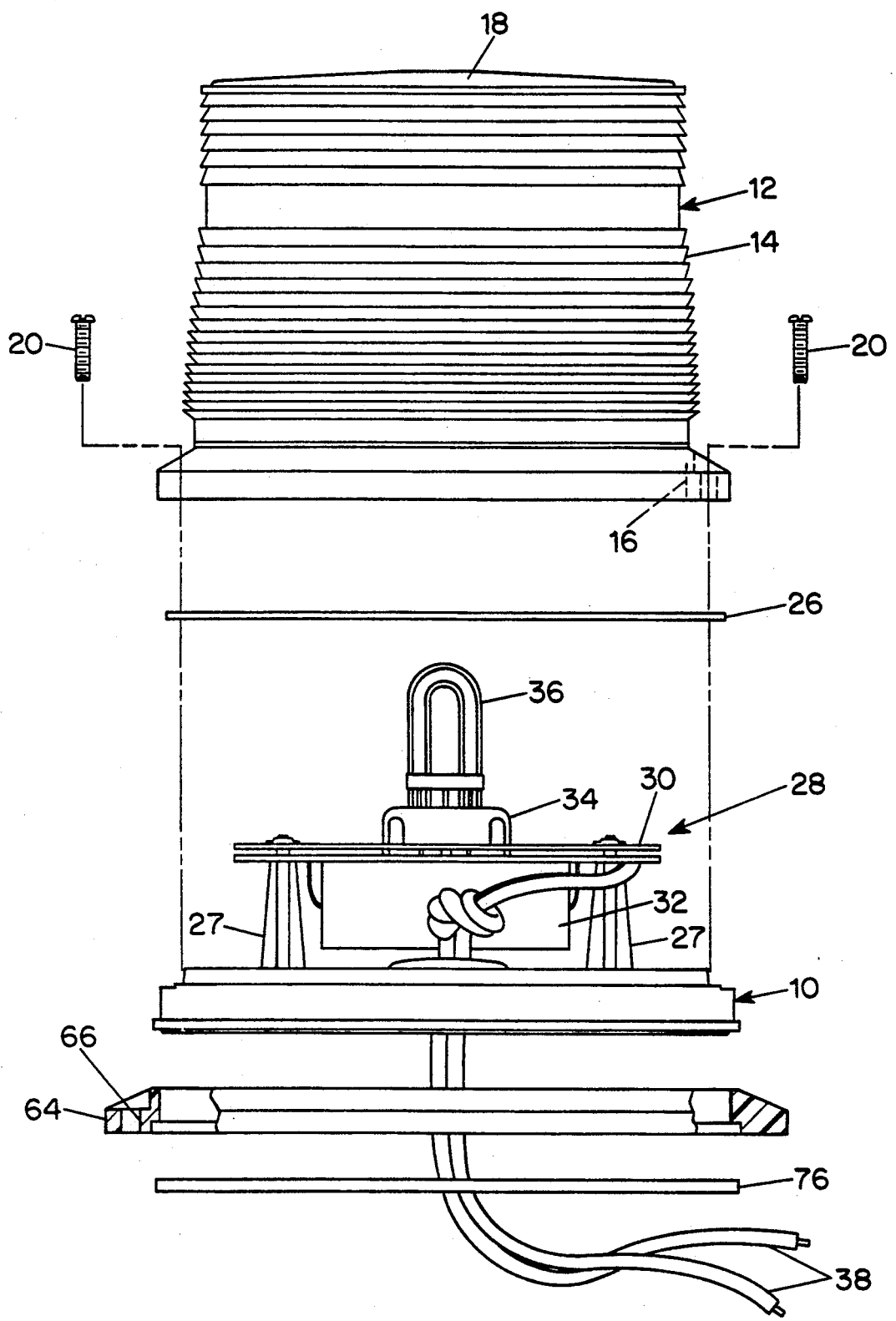
FIG. 1 is an exploded side elevational view of the embodiment.
Figure 2:
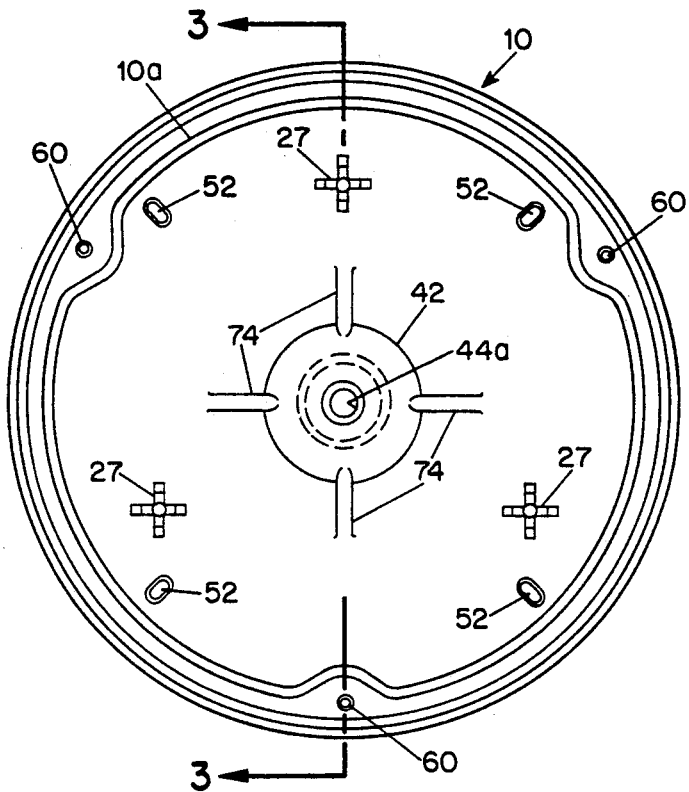
FIG. 2 is a top plan view of the base of the embodiment.
Figure 3:
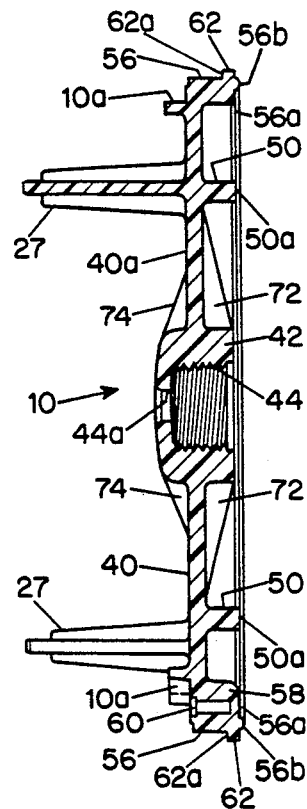
FIG. 3 is a cross-sectional view of the base taken along the lines 3—3 of FIG. 1 (one of the mounting posts for the lamp/electronics unit has been rotated into the plane of the view for clearer illustration)
Figure 4:
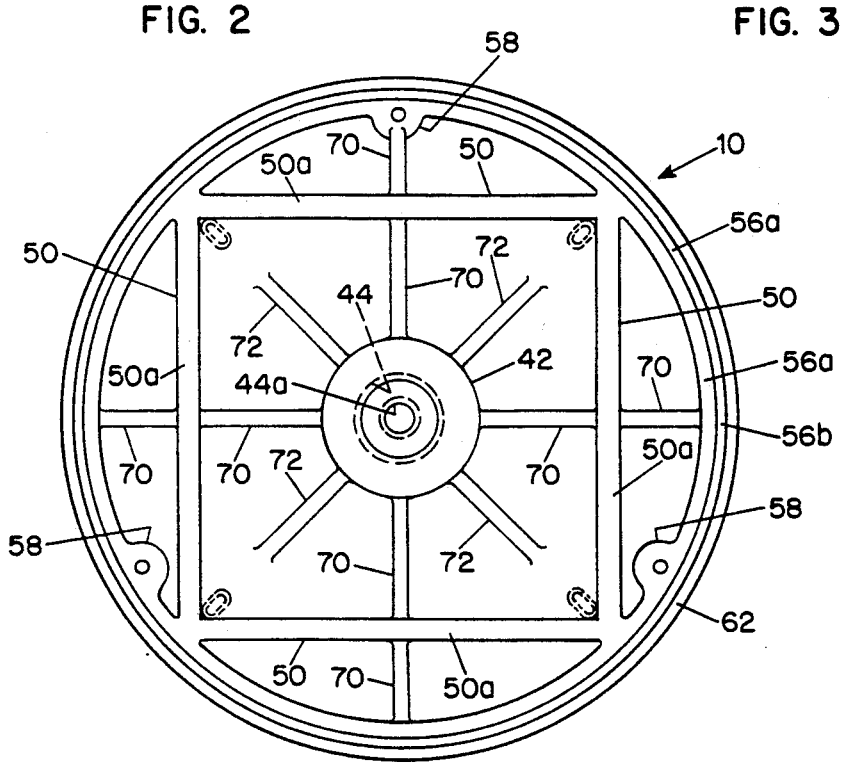
FIG. 4 is a bottom plan view of the base.

As shown in FIG. 1, the strobe light comprises a base 10, a lens 12 having a generally cylindrical side wall 14 defining an opening 16 at one end and having an end wall 18 at the other end. The lens, which is a Frenzel lens, is attached at its open end to the base by screws 20 received in holes 60 in screw bosses 58 in the base (see FIGS. 2 and 3). The opening of the lens mates with a locating rib 10a on the base, and an annular gasket 26 that matches in plan the land area of the lens on the base is received between the lens and the base.

A lamp/electronics assembly 28 is mounted on tapered, cruciform mounting posts 27 on the base and is received within the side wall 14 of the lens. The assembly 28 includes a mounting plate 30, an electronics package 32, a lamp socket 34 and a lamp 36. Wires 38 lead from the assembly and are connected to a suitable power supply (not shown). The electronics of the strobe light are designed to use all standard DC battery voltages.

The base 10 has a generally planar main wall 40 that is shaped and dimensioned such as to form a closure for the opening 16 of the lens side wall 14 and having a front surface 40a facing the end wall 18 of the lens and a rear surface 40b facing away from the end wall of the lens. A generally centrally located mounting boss 42 having a threaded socket 44 is adapted to receive a threaded mounting member (not shown), which is commonly a length of ½ inch plumbing pipe. Accordingly, the threads are ½-14 NPT (National Standard Taper). A hole 44a is provided in the boss 42 to lead the wiring from the power source to the electronics package.

A box-mounting flange 50 projects from the rear surface of the main wall 40 of the base. The flange 50 is square in plan and is shaped and dimensioned to present a substantially planar edge 50a that is wide enough to engage the edges of the side walls of either standard four-inch or standard 100-millimeter electrical boxes (not shown). Knockout holes 52 in the main wall adjacent each corner of the box-mounting flange 50 are adapted to receive screws (not shown) for attaching the base to the electrical boxes. The knock-out holes are elongated and are oriented with their longer dimensions extending diagonally of the box-mounting flange so that they can accept screws for either standard four-inch or standard 100-millimeter electrical boxes.

An edge flange 56 projects from the perimeter of the rear surface of the main wall and has a substantially planar rear edge 56a located rearwardly of the edge of the box-mounting flange that is adapted to engage a planar surface on which the base is mounted in surface-mounted installations. A small bead 56b projects from the edge 56a and extends entirely around the base; the bead 56b presses into a gasket (described below) and enhances the seal between the base and the gasket. A plurality of circumferentially spaced-apart screw-receiving bosses 58 in the edge flange have holes 60 that receive the screws 20 by which the lens is attached to the base.

The base has a peripherally extending rib 62 that projects outwardly from the edge flange and has a front-facing shoulder 62a. An annular mounting ring 64 (FIG. 1) surrounds and engages the edge flange and the rib of the base and has circumferentially spaced-apart holes 66 that receive screws by which the mounting ring may be fastened to a planar surface and thereby fasten the base to such surface.

A plurality of angularly spaced-apart, generally radially extending stiffener ribs 70 are joined to and project from the back surface of the main wall and join the edge flange, the box-mounting flange, and the mounting boss. The ribs 70 and radial ribs 72 and 74 joining the mounting boss 42 and the main wall 40 of the base enhance the strength and stiffness of the base 10, especially in pipe-mounted installations.

A base gasket 76 shaped and dimensioned to be coextensive with the base is adapted to be engaged adjacent its perimeter between the mounting ring and a planar surface on which the strobe is mounted. As mentioned above, the bead 56b on the base pushes into the gasket and ensures a good seal against intrusion of water into the interior of the strobe. The gasket also provides a cushioning effect as a buffer between the strobe and a surface on which it is mounted.

The base 10, lens 12, and mounting ring 64 are molded from a suitable rigid, high impact strength polymeric material, such as "Lexan."

The gaskets are die-cut from any suitable gasket sheet stock.

Typical mounting conditions are as follows:

The base is threaded onto a ½ inch pipe, which threads into the socket 44. The wires 38 pass through the hole 44a in the socket boss 42 and through the pipe, or wires from the power source pass through the pipe and are fastened to the wires 38.

Two or more of the knock-out holes 52 are knocked out, and fasteners are passed though the holes 52 and into a member having a planar surface. The use of the base gasket 64 is optional, though it is desirable to install it in outdoor installations. The member may be an element, such as a wall or ceiling, of a building or a panel of a vehicle or industrial equipment (e.g., a crane, conveyor, movable machine part or the like).

The base is attached by screws passing through knock-out holes 52 into the mounting lugs of a standard four inch or 100-millimeter electrical box. The base gasket can be used to waterproof the strobe in box-mounted installations.

The strobe is attached to a surface of a member by the annular mounting ring 64, which is fastened to the member by fasteners that pass through the holes 66 in the ring. The ring surrounds and engages the edge flange 56 and the rib 62 and clamps the base to the surface by means of the shoulder 62a. Again, the base gasket is optional, but desirable.

We claim:

1. In a strobe light of a type suitable for safety, notification, and intrusion systems and the like and including a base, a lens having a generally cylindrical side wall defining an opening at one end, having an end wall at the other end and being attached at its open end to the base, and a lamp/electronics assembly mounted on the base and received within the side wall of the lens, the improvement wherein the base has a generally planar main wall that is shaped and dimensioned such as to form a closure for the opening of the lens side wall and having a front surface facing the end wall of the lens and a rear surface facing away from the end wall of the lens, a generally centrally located mounting boss having a threaded socket adapted to receive a threaded mounting member, a box-mounting flange projecting from the rear surface of the main wall portion, the box-mounting flange being substantially square in plan and being shaped and dimensioned to present a substantially planar edge that is adapted to engage the edges of the side walls of either standard four-inch or standard 100-millimeter electrical boxes, and knockout holes in the main wall adjacent each corner of the box-mounting flange and adapted to receive screws for attaching the base to such electrical boxes.

2. The improvement according to claim 1 wherein the knock-out holes are elongated and are oriented with their longer dimensions extending diagonally of the box-mounting flange so that they can accept screws for either standard four-inch or standard 100-millimeter electrical boxes.

3. The improvement according to claim 1 wherein the base further includes an edge flange projecting from the perimeter of the rear surface of the main wall and having a substantially planar rear edge located substantially in the plane of the edge of the box-mounting flange and adapted to engage a planar surface on which the base is mounted.

4. The improvement according to claim 3 wherein the base further includes a plurality of circumferentially spaced-apart screw-receiving bosses in the edge flange adapted to receive screws by which the lens is attached to the base.

5. The improvement according to claim 3 wherein the base has a peripherally extending rib that projects outwardly from the edge flange and has a front-facing shoulder, and wherein the strobe further comprises an annular mounting ring that is shaped and dimensioned to surround and engage the edge flange and the rib of the base and has circumferentially spaced-apart holes adapted to receive fasteners by which the mounting ring may be fastened to a planar surface and thereby fasten the base to such surface.

6. The improvement according to claim 3 wherein the base further includes a plurality of angularly spaced-apart generally radially extending stiffener ribs joined to and projecting from the back surface of the main wall and joining the edge flange, the box-mounting flange, and the mounting boss.

7. The improvement according to claim 3 wherein the strobe further includes a base gasket shaped and dimensioned to be coextensive with the base and adapted to be engaged adjacent its perimeter between the edge flange of the base and a planar surface on which the strobe is mounted.

8. The improvement according to claim 3 wherein the strobe further includes a base gasket shaped and dimensioned to be coextensive with the base and adapted to be engaged between the box-mounting flange of the base and an electrical box on which the strobe is mounted.

* * * * *